United States Patent [19]

Richeson, Jr. et al.

[11] Patent Number: 4,878,464
[45] Date of Patent: Nov. 7, 1989

[54] PNEUMATIC BISTABLE ELECTRONIC VALVE ACTUATOR

[75] Inventors: William E. Richeson, Jr.; Frederick L. Erickson, both of Fort Wayne, Ind.

[73] Assignee: Magnavox Government and Industrial Electronics Company, Fort Wayne, Ind.

[21] Appl. No.: 153,257

[22] Filed: Feb. 8, 1988

[51] Int. Cl.$^4$ ............................ F01L 9/04; F01L 9/02
[52] U.S. Cl. ................ 123/90.11; 123/90.14; 91/465; 137/625.64
[58] Field of Search ............... 123/90.11, 90.14, 90.24; 137/625.64; 91/465

[56] References Cited

U.S. PATENT DOCUMENTS

| | | | |
|---|---|---|---|
| 2,552,960 | 5/1951 | Grieshaber et al. | 123/90.14 |
| 4,074,699 | 2/1978 | Stampfli | 137/625.64 |
| 4,257,573 | 3/1981 | Stampfli | 137/625.64 |
| 4,605,197 | 8/1986 | Casey et al. | 137/625.64 |

FOREIGN PATENT DOCUMENTS 197808  8/1978  Fed. Rep. of Germany ... 123/90.14

Primary Examiner—Charles J. Myhre
Assistant Examiner—Weilun Lo
Attorney, Agent, or Firm—Roger M. Rickert; Thomas A. Briody; Richard T. Seeger

[57] ABSTRACT

A bistable electronically controlled pneumatically powered transducer for use, for example, as a valve mechanism in an internal combustion engine is disclosed. The transducer armature, an engine valve, for example, is powered by a pneumatic source and includes pneumatic damping and energy recovery as it nears its destination position. The armature is held in each of its extreme positions by a permanent magnet latching arrangement and is released therefrom to be pneumatically driven to the other extreme position by an electromagnetic arrangement which temporarily neutralizes the permanent magnetic field of the latching arrangement. A multiplicity of engine operating modes are also disclosed including operation of an engine in a six stroke cycle mode, and a unique intake valve timing scheme where the intake valve closure is delayed beyond bottom dead center of its associated cylinder with the delay being greater at lower engine speeds and less at higher engine speeds.

15 Claims, 14 Drawing Sheets

PNEUMATIC BISTABLE ELECTRONIC VALVE ACTUATOR

SUMMARY OF THE INVENTION

The present invention relates generally to a two position, straight line motion actuator and more particularly to a fast acting actuator which utilizes stored pneumatic energy against a piston and shaft assemby to perform extremely fast transit times between the two positions. The invention utilizes a strong latching magnet to hold a piston and shaft assembly at each of the positions until a timed short term electrical energy pulse excites a coil around the magnet to partially neutralize the magnet's holding force and release the piston. Stored pneumatic gases accelerate the piston and shaft assembly rapidly toward the other position. During movement of the piston and shaft assembly from one position to the other, a mechanical valve opens to allow high pressure air to fill a chamber applying an opposing force on the piston to slow the piston and providing a pressure charged chamber ready, upon release, to power the piston and shaft assembly back to the first position.

This actuator finds particular utility in opening and closing the gas exchange, i.e., intake or exhaust, valves of an otherwise conventional internal combustion engine. Due to its fast acting trait, the valves may be moved between full open and full closed positions almost immediately rather than gradually as is characteristic of cam actuated valves.

The actuator mechanism may find numerous other applications such as in compressor valving and valving in other hydraulic or pneumatic devices, or as a fast acting control valve for fluidic actuators or mechanical actuators where fast controlled action is required such as moving items in a production line environment.

Internal combustion engine valves are almost universally of a poppet type which are spring loaded toward a valve-closed position and opened against that spring bias by a cam on a rotating cam shaft with the cam shaft being synchronized with the engine crankshaft to achieve opening and closing at fixed preferred times in the engine cycle. This fixed timing is a compromise between the timing best suited for high engine speed and the timing best suited to lower speeds or engine idling speed.

The prior art has recognized numerous advantages which might be achieved by replacing such cam actuated valve arrangements with other types of valve opening mechanism which could be controlled in their opening and closing as a function of engine speed as well as engine crankshaft angular position or other engine parameters. For example, U.S. Pat. No. 4,009,695 discloses hydraulically actuated valves in turn controlled by spool valves which are themselves controlled by a dashboard computer which monitors a number of engine operating parameters. This paten references many advantages which could be achieved by such independent valve control.

Other attempts to replace the conventional cam actuated valve have included solenoid actuated valves; solenoid controlled hydraulic valve openers; individual cams, one for opening and one for closing the valve; and several schemes having as their primary goal the deactivation of one or more engine cylinders dependent upon engine demand.

These prior art attempts have not been effective in all of the desired characteristics and have, therefore, failed to achieve the recognized goals for at least the following reasons: Solenoids operate on magnetic attraction principles where the force of attraction is inversely proportional to the square of distance and are slow in operation because the available forces, which are needed to overcome the inertia of the system, are low. Hydraulic valve actuators and especially control valves for such actuators are slow or sluggish in response and fail to open and close the valve quickly without the use of high hydraulic pressures. Multiple cams for each valve require multiple cam shafts and a complex mechanical arrangement or servomechanism to control the relative timing of those cams, all leading to higher costs, reduced reliability and often slower opening and closing rates than the desired action. In addition, the associated throttling offered by the slow acting valve prevents the full value of valve control from being realized.

In copending application Ser. No. 021,195 entitled Electromagnetic Valve Actuator, filed Mar. 3, 1987 in the name of William E. Richeson and assigned to the assignee of the present application, there is disclosed a valve actuator which has permanent magnet latching at the open and closed positions. Electromagnetic repulsion may be employed to cause the valve to move from one position to the other. Several damping and energy recovery schemes are also included.

Other related applications all assigned to the assignee of the present invention and filed on even date herewith are Ser. No. 07/153,262 (William E. Richeson) Potential-Magnetic Energy Driven Valve Mechanism where energy is stored from one valve motion to power the next and a latch release scheme similar to that in the present invention is employed, Ser. No. 07/153,154 (William E. Richeson) Repulsion Actuated Potential Energy Driven Valve Mechanism wherein a spring (or pneumatic equivalent) functions both as a damping device and as an energy storage device ready to supply part of the accelerating force to aid the next transition from one position to the other and Ser. No. 07/153,155 (William E. Richeson and Frederick L. Erickson) Pneumatically Powered Valve Actuator. One distinguishing feature of this last application is that control valves and latching plates have been separated from the primary working piston to provide both lower latching forces and reduced mass resulting in faster operating speeds. One distinguishing feature of the Repulsion Actuated Potential Energy Driven Valve Mechanism application is the fact that initial accelerating force is partly due to electromagnetic repulsion somewhat like that employed in the first abovementioned copending application.

In the first referenced copending application numerous advantages and operating mode variations suitable for incorporation with the present valve actuator are disclosed and the entire disclosures of all four of these applications are specifically incorporated herein by reference.

The present invention employs a release type mechanism rather than a repulsion scheme. The disclosed device is a truly pneumatically powered valve with a reasonably low pressure air supply and control valving to use the air for both damping and as the primary motive force. The use of reasonably low pressure (on the order of 80-100 psi) allows for the use of source air using single stage air compressor designs with their attendent low cost, simplicity and safety.

Among the several objects of the present invention may be noted the provision of a pneumatically powered poppet valve; the provision of a bistable electromechanical transducer of improved transition times between its stable states; the provision of a magnetic latching and electromagnetic dislodging arrangement in a pneumatically powered valve; the provision of a valve arrangement which may be operated at higher speeds and with almost instantaneous return capability; and the provision of a valve arrangement which stores energy as it is slowed near one extreme of its travel to be utilized on the next actuation of the valve. These as well as other objects and advantageous features of the present invention will be in part apparent and in part pointed out hereinafter.

The foregoing objects are achieved in accordance with the present invention by providing a pre-charged pressure chamber which acts like a strong cocked nearly mass-less spring as the primary source of the motive force. This provides a large amount of potential energy which is instantaneously transformed into linear motion of the valve shaft when a magnetic latch is released.

In general, an electronically controllable pneumatically powered valve mechanism for use in an internal combustion engine includes an engine valve having an elongated valve stem and a source of pneumatic pressure for causing the valve to move in the direction of stem elongation between valve-open and valve-closed positions. A pneumatic decelerating arrangement slows the valve as the valve nears one of said valve-open and valve-closed positions and a permanent magnetic latching arrangement is provided for holding the valve in each of the valve-open and valve-closed positions. An electronically controlled electromagnet is temporarily energized for neutralizing and releasing the permanent magnet latch allowing the pneumatic source to move the valve.

Also in general, and in one form of the invention, a bistable electronically controlled pneumatically powered transducer has an armature reciprocable between first and second positions and is moved back and forth by a source of compressed air. A piston is fixed to and movable with the armature and an air vent is located about midway between the first and second positions for dumping air and removing the accelerating force from the piston as it approaches one of the first and second positions. The air vent also facilitates brakeing of the armature and energy recovery from armature motion as the armature nears said one position. A pair of pneumatic seals, one engaging one surface of the piston when the armature is in the first position and the other engaging an opposite surface of the piston when the armature is in the second position function, when engaging a piston surface, to reduce the piston surface area exposed to the source of compressed air thereby reducing the effective force on the armature. The armature is held at opposite extremes of its travel by permanent magnet latches and released therefrom by temporary energization of electromagnets which neutralize the permanent magnetic fields.

Still further in general and in one form of the invention, a method of operating an electronically controlled valve actuating mechanism and an associated intake valve on a reciprocating piston four stroke cycle internal combustion engine includes the steps of delaying closure of the intake valve prior to its reaching bottom dead center as well as delaying closure after the associated cylinder reaches bottom dead center, and decreasing the amount of that delay upon an increase in either engine speed the torque demand on the engine. In the first mode of operation, The quantity of injected mixture is directly controlled. In the second mode of operation, the delay is sufficiently long at low engine speeds for a significant quantity of ingested fuel/air mixture to be expelled from the cylinder prior to closure of the intake valve and subsequently ingested into another engine cylinder. Another method of operating electronically controlled valve actuating mechanisms and their associated intake and exhaust valves of a common piston on a reciprocating piston internal combustion engine comprises selectively maintaining both the intake and exhaust valves closed during a complete piston stroke from top dead center to bottom dead center during a portion of the engine cycle. In this method, the engine normally operates in a four stroke cycle mode and is converted to a six stroke cycle mode when the valves are maintained closed throughout the piston stroke.

The presently preferred embodiment of the transducer is as a valve mechanism for an internal combustion engine. Since the valve is pneumatically powered and electronically controlled, it is sometimes herein referred to as a "pneutronic" valve.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
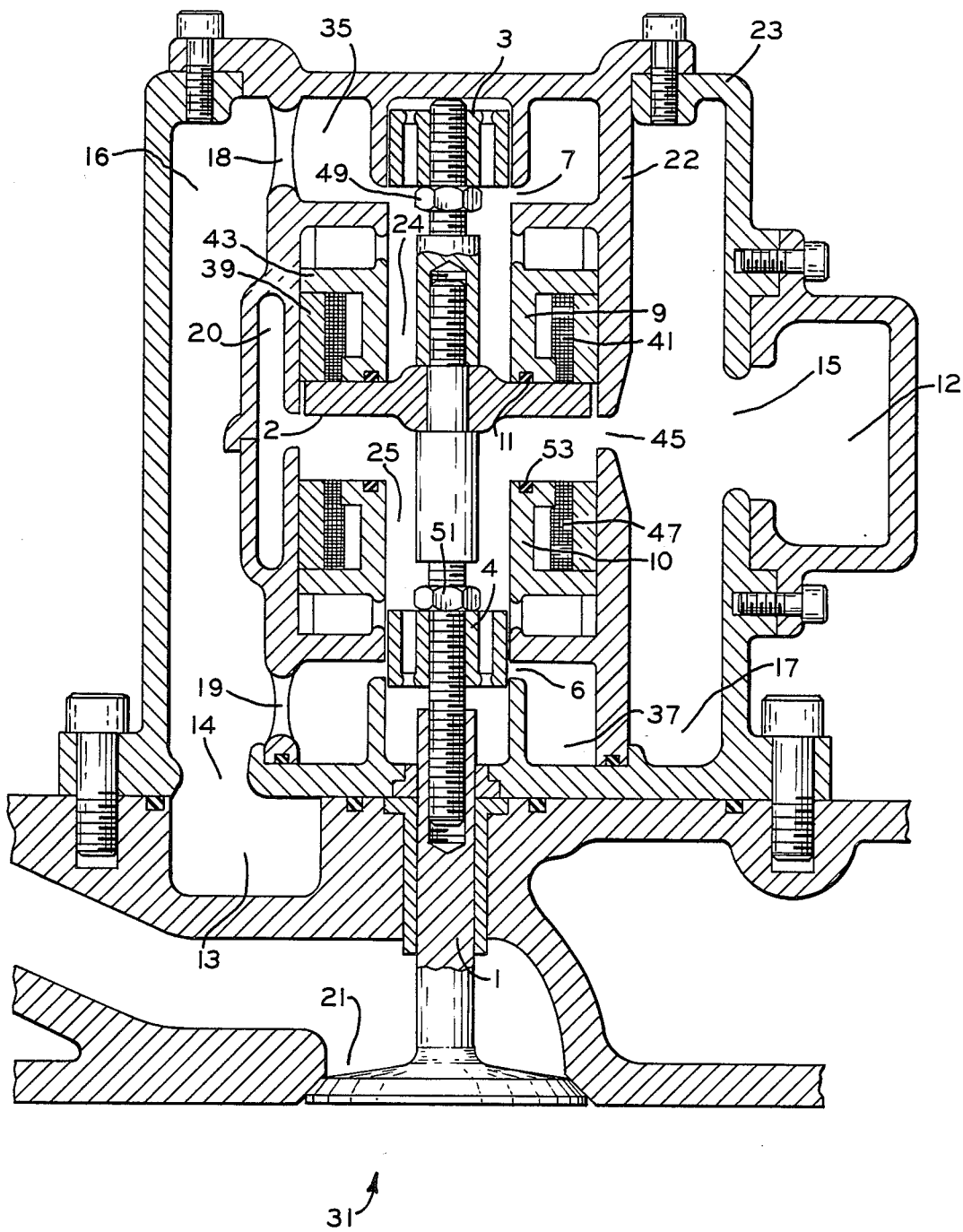
FIG. 1 is a view in cross-section of a pneutronic valve operating mechanism illustrating the invention in one form with the valve in the upward seated position.
Figure 6:
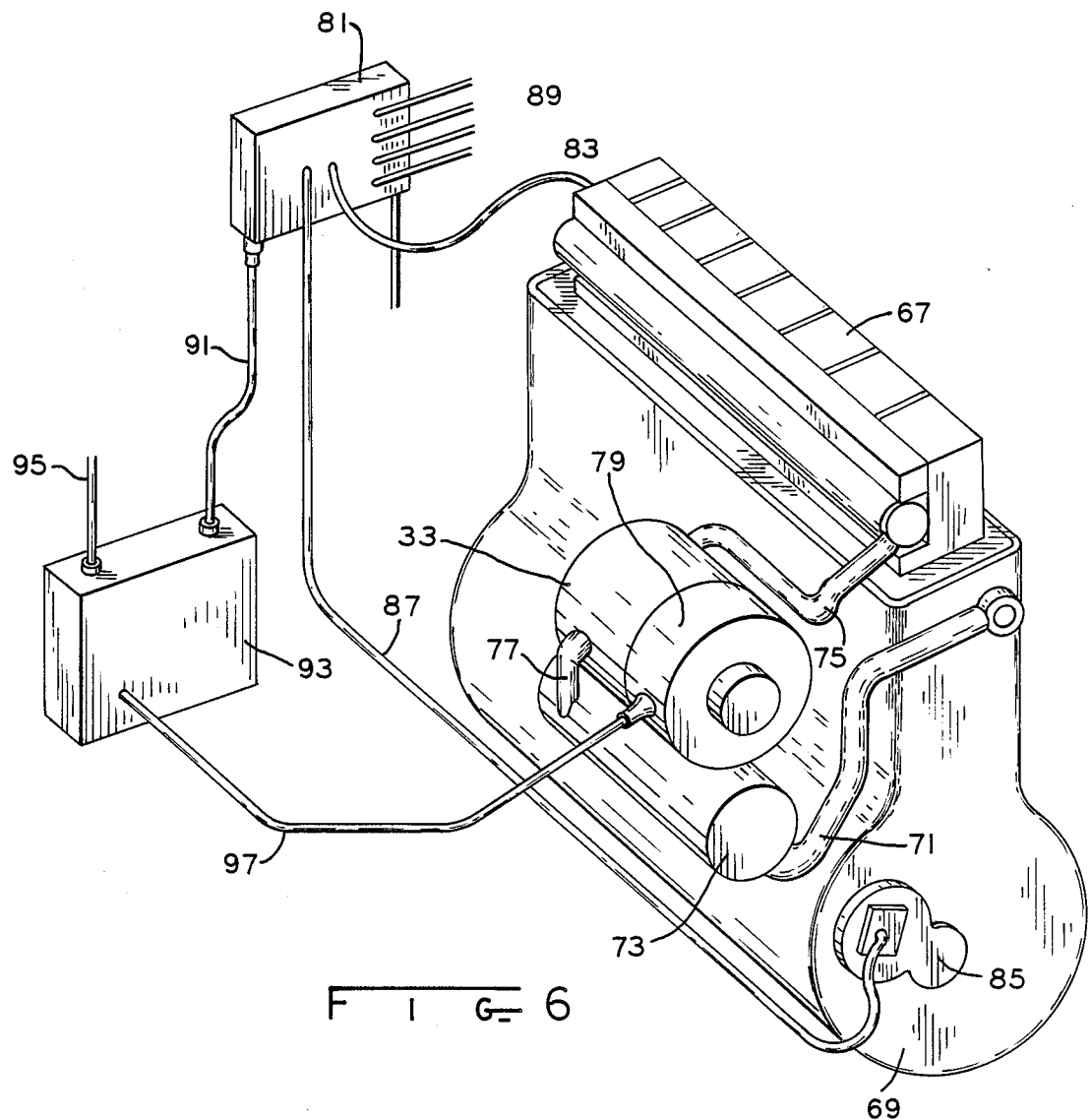
FIG. 6 is a somewhat diagrammatic perspective illustration of an internal combustion engine incorporating the present invention.

Referring generally to FIG. 1, the mechanism for actuation a single valve 31, for example, to open and close an engine exhaust port 21 is shown. The mechanism is pneumatically powered, electronically controlled and will be described for use in an internal combustion engine as illustrated in FIG. 6. The mechanism employs pneumatic propulsion principles for causing the valve 31 to move in the direction of elongation of a valve stem 1 between valve-open and valve closed positions illustrated in FIGS. 4 and 1 respectively. Another source of propulsion is due to the magnetic attraction of the opposing magnetic latch. The mechanism may include a housing 23 at least partially surrounding the valve stem 1 and an arrangement for circulating and storing air or other pneumatic working fluid within the housing 23. This makes the working fluid readily available to rapidly operate the valve actuating mechanism.

The mechanism includes a main valve 31 and piston 2 assembly which is located within a cylindrical housing 22 which is in turn located within the larger outer housing 23. High pressure supply air is furnished by an air pump 33 of FIG. 6 to the cavity 13 which feeds into inlet manifold chamber 16 through port 14. Chamber 16 supplies high pressure air to the end chambers 35 and 37 by way of ports 18 and 19 respectively. Low pressure expended air is collected in the middle of the nonmagnetic material cylinder 22 by an annular collector chamber 20 and fed to the exhaust manifold chamber 17 and through port 15 into the exhaust collector cavity 12.

In FIG. 1, the valve is fully closed with ferromagnetic piston 2 contacting and magnetically latched to an upper magnet and coil assembly 9. This assembly 9 includes an annular permanent magnet 39 which is axially magnetized, an annular coil 41 and an annular ferromagnetic pole piece 43. In this position, cylindrical air valve 3 has fully opened port 7 to effectively provide full pressurization to chamber 24 from chamber 16 by way of end chamber 35 with that pressure applied to the exposed surface of piston 2. With the valve latched in the closed position as illustrated in FIG. 1, a small circular seal 11 reduces the piston surface area exposed to the pressure in chamber 24 and therefore also limits or restricts the downward force on piston 2. When the piston is unlatched and moves a very short distance downward, this seal is broken and the pressure in chamber 24 acts on the entire piston surface area providing a strong force and rapid acceleration of the valve toward its open position. The force on the piston is equal to the pressure multiplied by the area to which that pressure is applied. When the seal 11 is broken, the area and, therefore, also the force, increases dramatically. This force multiplication feature allows the use of a small latch to hold the piston against the initial pressure and lower electrical energy to release this smaller latch while applying full pressure to the piston as soon as the latch releases.

The latch is released and the seal is broken by applying a pulse of electrical energy to the coil 41 which creates an electromagnetic field opposing and neutralizing the field of the permanent magnet 39 sufficiently to allow the pressure on the reduced piston surface area to move the piston away from the seal. Thereafter, the force increases (by a factor of about three in one embodiment) and rapidly accelerates the valve through at least one-half of its total downward travel. As the valve moves downward, cylindrical air valve 3 closes port 7 (compare FIGS. 1 and 2) so that although the piston was originally accelerated by air pressure in chamber 24 as replenished through port 7, the last part of the expansion work will be continued from the high pressure air remaining in chamber 24.

Figure 2:
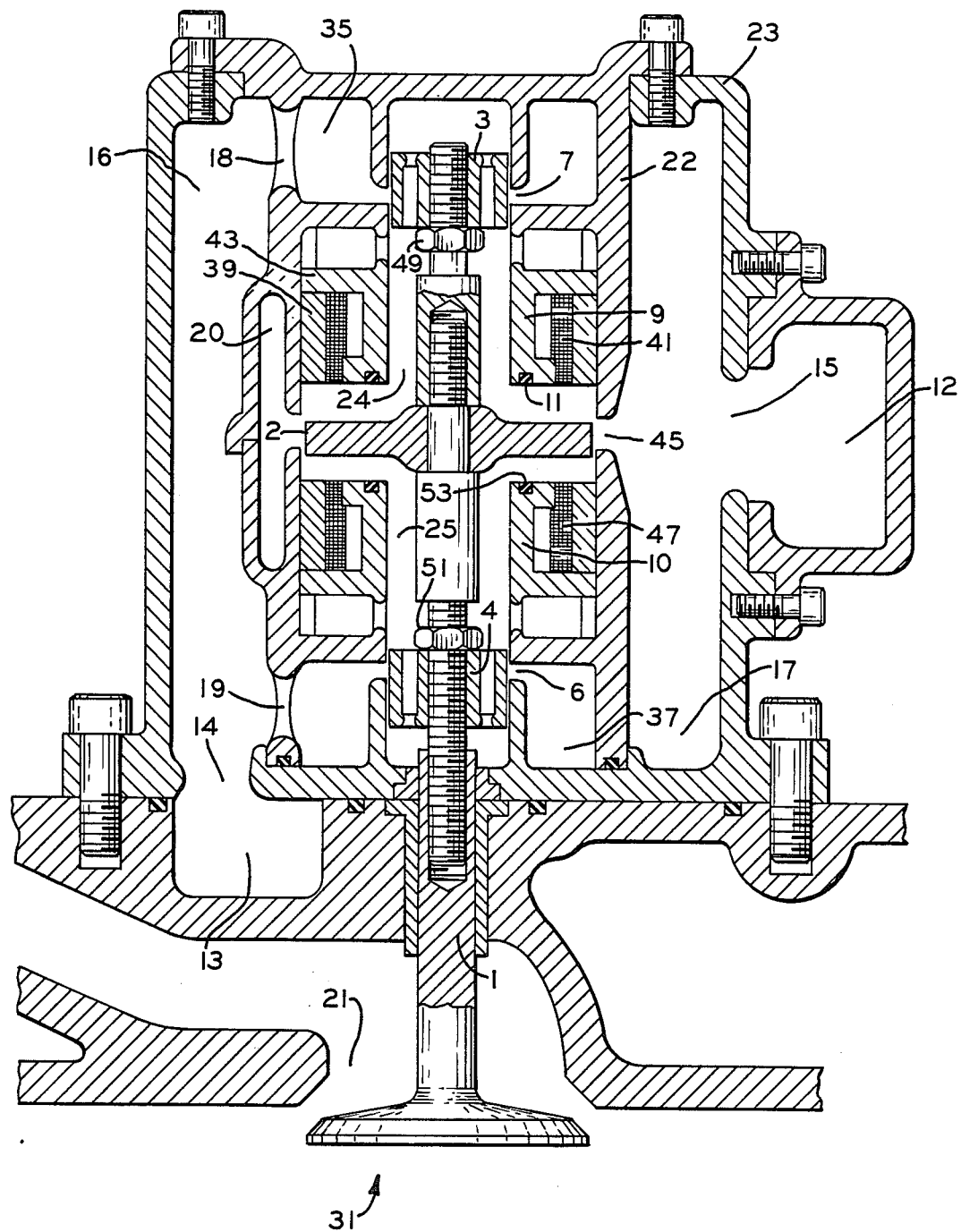
FIG. 2 is a cross-sectional view of the mechanism of FIG. 1, but showing the valve in the midway position.

In FIG. 2, piston 2 has moved down sufficiently to uncover or open exhaust port 45 and dump the pressure in chamber 24 by way of annular chamber 20 to exhaust manifold chamber 17. In the position illustrated, the valve has attained its maximum velocity and is neither accelerating nor decelerating. The exhausted air is flowing out of chamber 17, into collector cavity 12 and back to the suction side of pump 33 in FIG. 6. Piston 2 now begins to compress the closed volume of air in chamber 25 and begins to slow down.

Figure 3:
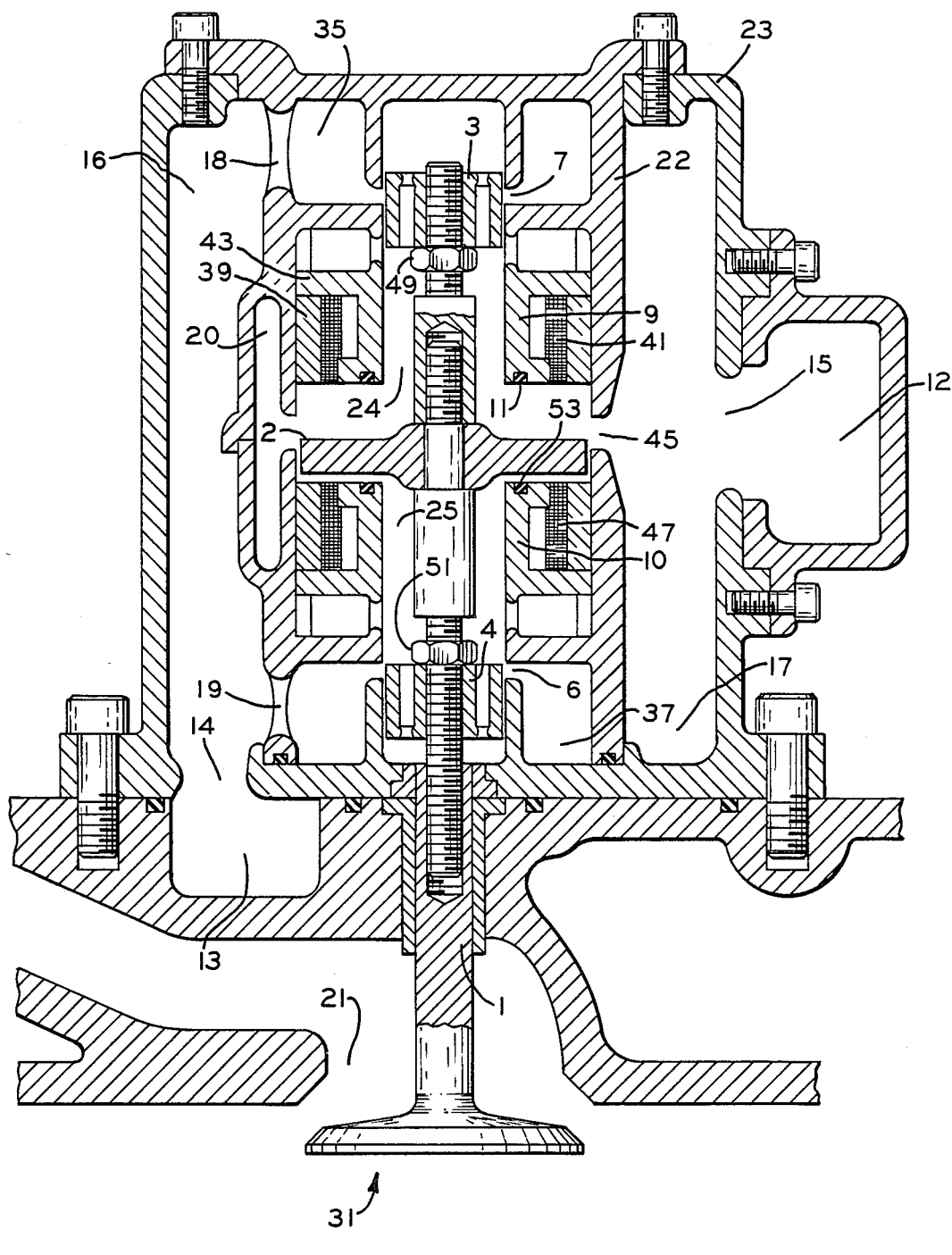
FIG. 3 is a cross-sectional view of the mechanism of FIGS. 1 and 2, but showing the valve being slowed near the valve open extreme of its motion.
Figure 4:
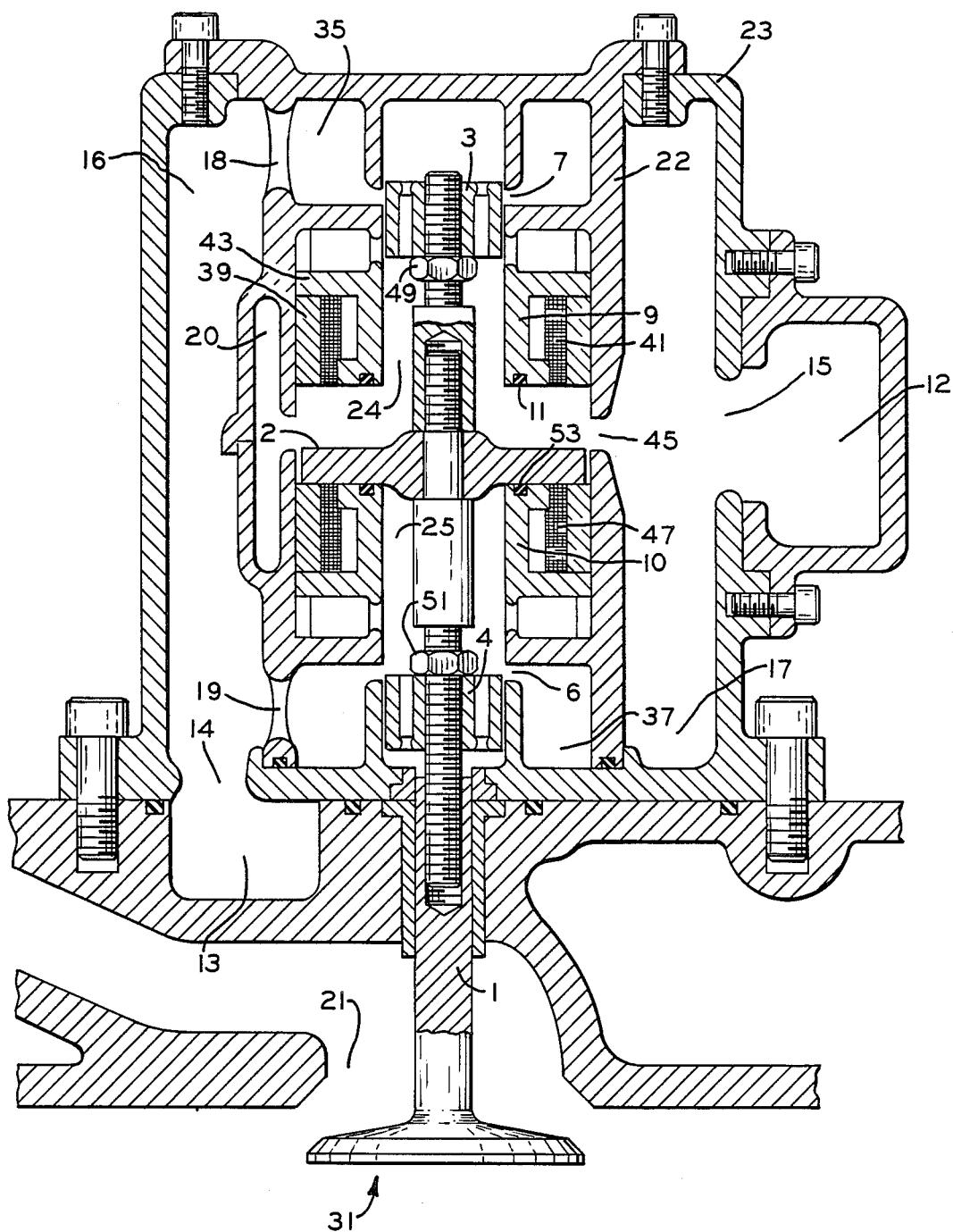
FIG. 4 is a cross-sectional view of the mechanism of FIGS. 1-3 in the fully open and latched position.

In FIG. 3, the valve 31 has moved further down and cylindrical air valve 4, which is similar to valve 3, has uncovered or opened port 6 to allow high pressure air to enter chamber 25 from end chamber 37. The opening of port 6 occurs at the right time to pressurize chamber 25 and apply sufficient back pressure or damping to the piston 2 to slow it to a low velocity just before it contacts the magnet and coil assembly 10. Assembly 10 is essentially the same as assembly 9 and includes a permanent magnet, a coil 47 and a pole piece. This pneumatic damping provides two significant advantages. There is some energy recovery in converting the kinetic energy of the piston and valve assembly back into compression of the air in chambers 25, 37 and back into the high pressure side of the pump. This also assures that chamber 25 is fully pressurized for moving the engine valve back toward the closed position upon energization of coil 47. The cylindrical air valves 3 and 4 are axially adjustable along the stem 1 and locked in position by nuts 49 and 51. The opening and closing of ports 7 and 6 may thus be selected to obtain just the right amount of back pressure to insure a mild impact between piston 2 and the magnetic latch assemblies. Just prior to magnetic latching, the piston 2 contacts and seals with annular seal 53 reducing the area exposed to the high pressure air and reducing the holding force required. FIG. 4 shows the valve latch in its full open position with chamber 25 pre-charged by the pumping action of the piston 2 being slowed in its downward motion.

Figure 5:
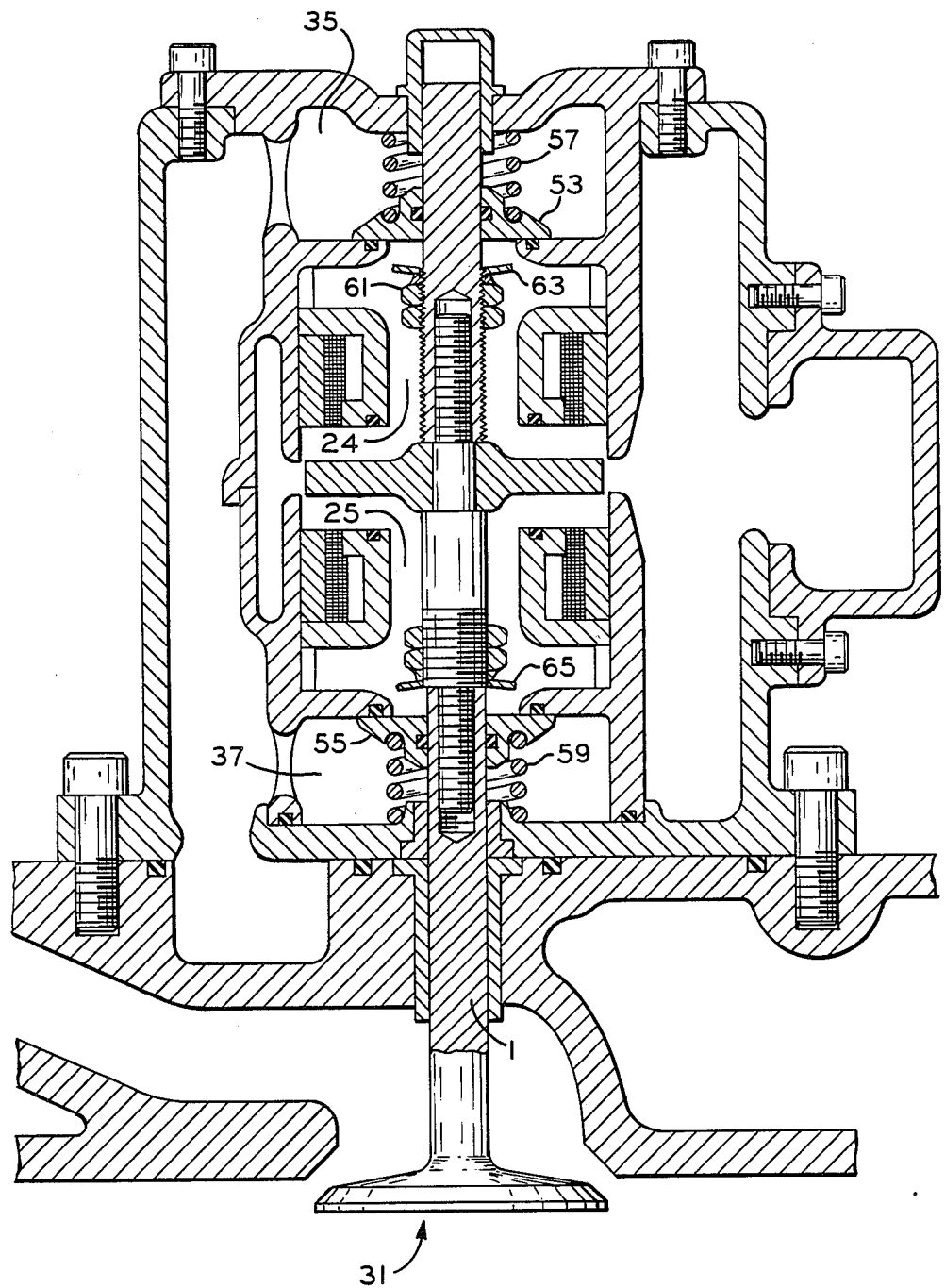
FIG. 5 is a cross-sectional view of a valve operating mechanism similar to that of FIGS. 1-4, but illustrating one modified form of the invention.

FIG. 5 illustrates a variation on the embodiment of FIGS. 1–4 using poppet valves 53 and 55 biased toward their closed positions by compression coil springs 57 and 59 respectively. These two valves replace the sliding valves 3 and 4 of the earlier embodiment in supplying high pressure air from end chambers 35 and 37 to the chambers 24 and 25. As the stem 1 moves upwardly, the adjustable abutment nut 61 and spring washer 63 engage and open the valve 53. Valve 55 is similarly open by downward valve stem movement when engaged by spring washer 65. The spring loaded poppet valves will overshoot at high operating speeds allowing air to enter chamber 24 or 25 at faster initial rates providing even faster valve actuation capability. The operation of the device of FIG. 5 is otherwise the same as discussed previously.

In FIG. 6, as many of the valve mechanisms of FIGS. 1–4 or 5 as required (typically two of each engine cylinder) are housed under the cover 67 of an internal combustion engine 69. A high pressure line 71 from the accumulator tank 73 is connected to the engine block and leads directly into the block air cavity such as 13 of FIGS. 1–4 to supply all the valve actuators. A suction line 75 is connected to each low pressure collector chamber such as 12 of FIGS. 1–4 and returns the expended air back to the suction side of pump 33. The pump high pressure outlet line 77 maintains the pressure within the accumulator 73 and the accumulator helps to minimize pressure fluctuations caused by the pump and the valve mechanisms. Pump 33 is driven by an electric motor/generator 79 to supply air pressure for powering the several penutronic valves.

The pulses of electrical energy which are supplied to coils such as 41 and 47 to cause valve stem translation are supplied from an engine management computer 81 through a multiconductor cable 83 to the individual coils. Proper timing of these pulses is determined by signals on line 87 from a crank angle (or function of the crank angle) sensor 85. A variety of other engine operating parameters may be monitored as by lines 89. The use of microcomputers to manage engine operation has been extensively discussed in the literature to which reference may be had for further details of such systems. When the engine ignition is initially turned on, the computer supplies a signal on line 91 which may enable a high power switching box 93 to provide energy from a source such as the vehicle battery on line 95 to the motor 79 by way of line 97 if voltages higher than that of the battery are required in a particular application.

Figure 7:
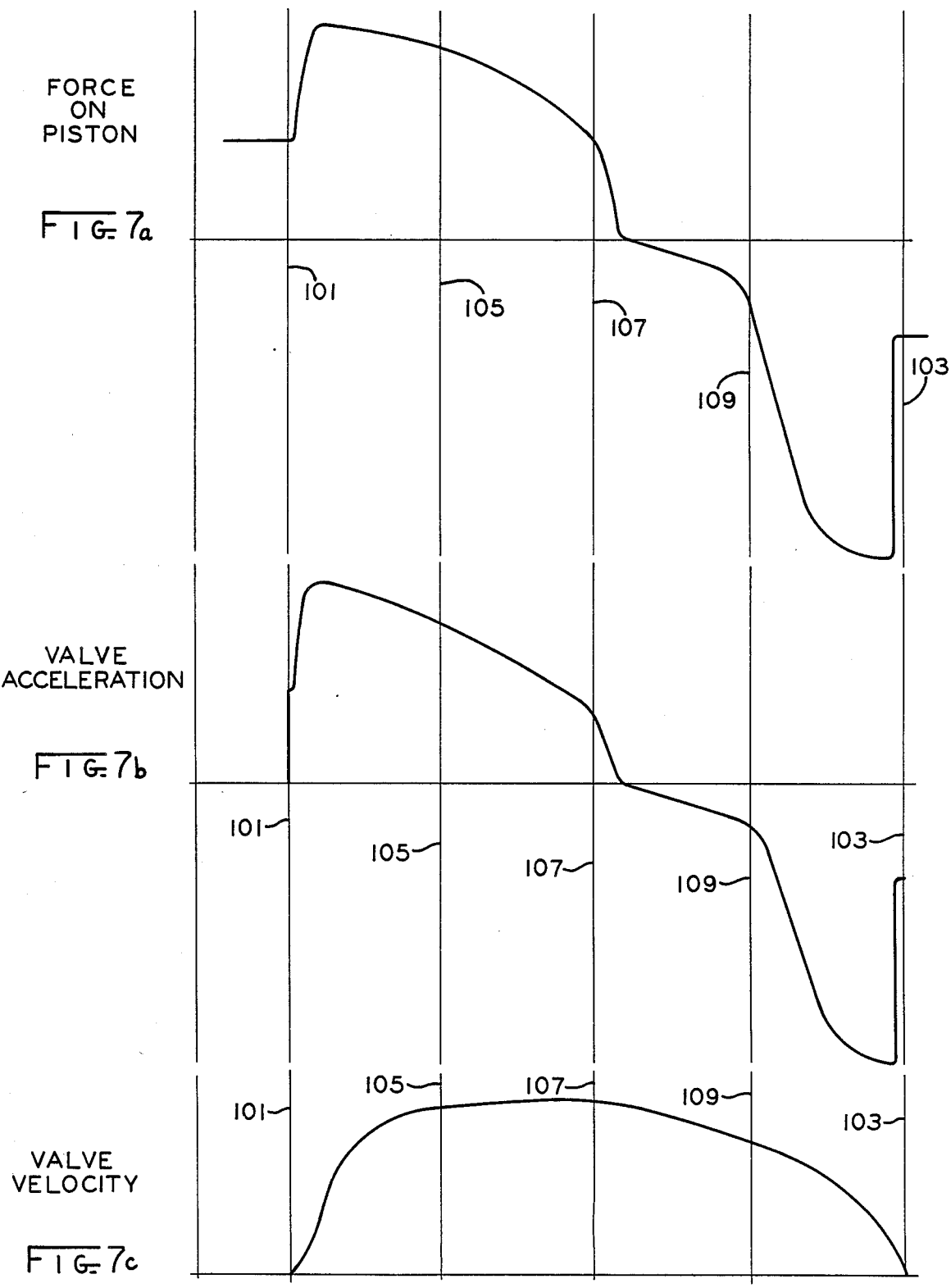
FIGS 7a-7c are functional diagrams illustrating the force and velocity of the valve as a function of its position.

The function diagrams of FIG. 7 illustrate respectively the force on the piston 2, the acceleration of the valve 31 and the velocity of that valve. FIGS. 7a and 7b differ only in the at-rest pressure applied to the reduced area of the piston face while the piston is latched at either extreme (vertical lines 101 and 103) of its linear path. Otherwise, the applied force is proportional to the acceleration. The vertical lines 105, 107 and 109 indicate respectively 25%, 50% and 75% of the piston stroke. When the valve is initially released from its closed position at 101, there is a short interval before the seal 11 is broken and full force is applied. When the valve is displaced through about 25% of its motion, the valve 3 (FIGS. 1-4) or 53 (FIG. 5) closes. After about 50% of its travel, it has reached its maximum velocity and the port 45 opens to dump air from the chamber 24 removing the accelerating force. The piston is now descelerated and when it reaches 75% of its travel, valve 4 or 55 opens to apply a very high decelerating force. It will be noted that the accelerating force is less than the maximum decelerating force due to the expanding air working on a piston which is rapidly accelerating with the expanding air, whereas, as the piston is being slowed and stopped, it is pumping air back against the high pressure side which increases the pressure in the chamber to a value higher than the initial working pressure.

Figure 8:
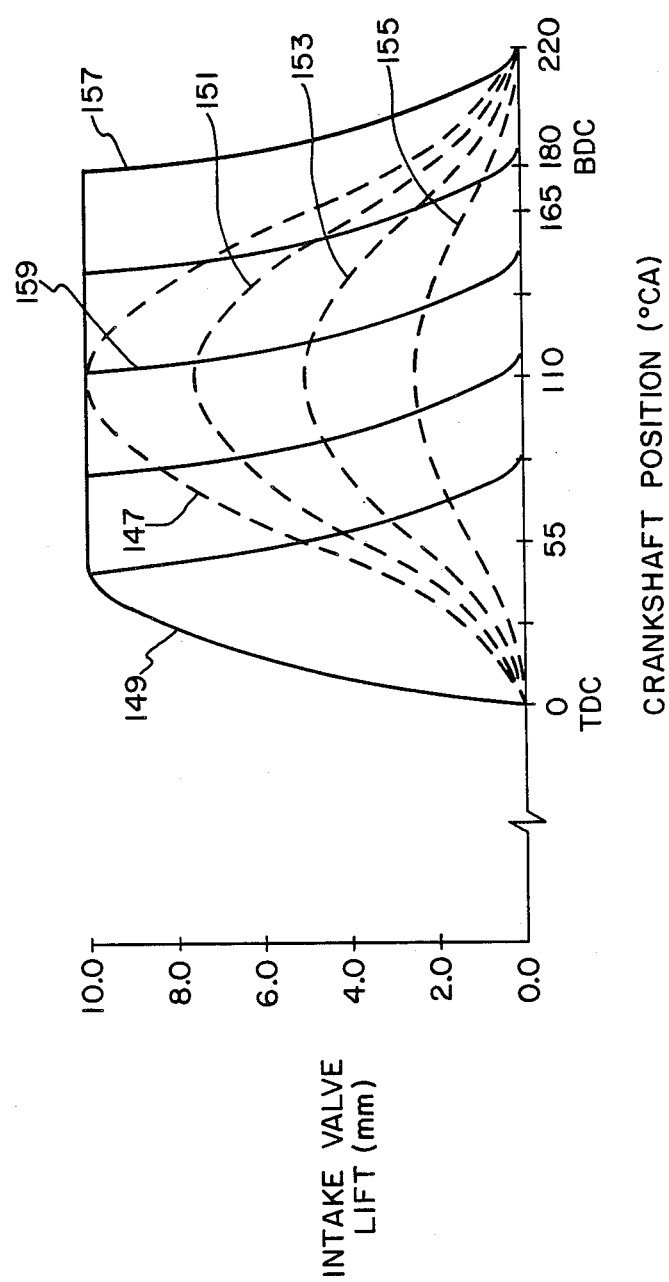
FIGS. 8 and 9 are graphs illustrating the motion of the valve of the present invention as compared to a conventional cam actuated valve.

The graph of FIG. 8 compares the effective valve motion of a conventional cam actuated valve (dotted lines such as curve 147) to motion of a valve actuated by the electromechanical transducer of the present invention (solid lines such as curve 149) both actuated at top dead center piston position and closing at 220 degrees beyond top dead center. Note that the early and late throttling effect of the conventional valve is eliminated by the rapid opening and closing of the valve arrangement of the present invention. For each of the depicted cases, the valve actually opens about 0.4 inches or 10 mm., however, further curves at $\frac{3}{4}$, $\frac{1}{2}$ and $\frac{1}{4}$ open throttle for a conventional engine are illustrated at 151, 153, and 155 respectively to illustrate the effect of carburetor throttling on the effective intake. With the present inventive valve arrangement, fuel injection with the manifold at essentially atmospheric pressure rather than conventional carburetion is contemplated and the valve can be closed at any preferred time along lines such as 157 or 159.

Figure 9:
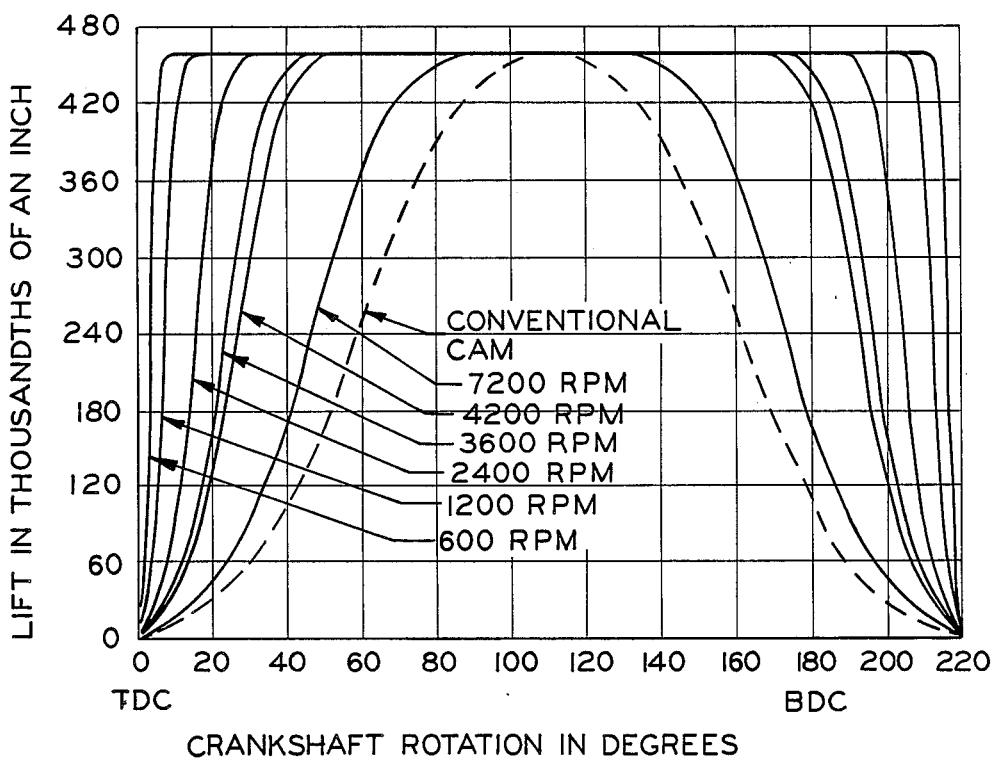

FIG. 9 shows another comparison between the valve motion of a conventional cam driven valve (again shown in dotted lines) as compared to the motion of a pneutronic actuated valve (shown in solid lines) for various engine speeds. At very high crankshaft rotation rates, the differences are less pronounced between the two types of valve actuator, but at lower rates, the differences are profound.

Thus, valve characteristics such as throttling, heat transfer, seating stress levels and damping can now be controlled, and valve timing optimized to maximize engine efficiency. Rapid valve operation will give rise to reduced pumping losses, increased volumetric efficiency, and allow for increasing the length of the engine power stroke. In particular, instead of controlling the engine by throttling the intake manifold thereby operating the engine in a vacuum pump or variable intake density mode, the engine, and in particular the cylinder charge, may be controlled by governing the duration of time the intake valve is open followed by an adiabatic expansion and compression, or by controlling the net time during the cycle that the intake valve is open as opposed to throttling the intake to the engine.

Closing the intake valve at a precise point in the cycle will increase low engine speed torque by stopping the reverse flow of the intake mixture back into the intake manifold which occurs in conventionally valved engines at low RPM. The sudden opening of the intake valve is advantageous in increasing turbulence and improving the mixing of fuel and air during the charging cycle. More rapid opening of the exhaust valve will reduce the heretofore necessary lead time in starting exhaust blow down in the expansion stroke. The later opening of the exhaust valve extends the power stroke and reduces pumping losses. The more rapid the opening and closing of the exhaust and intake valves, the higher the fluidynamic resonance Q factor, which will increase volumetric efficiency throughout the engine's operating range. Improvement in the volumetric efficiency of air compressors is also possible with such intake valve arrangements. The more rapid opening of the exhaust valve with less throttling and the reduction of the peak velocity of the boundry layer of the hot gasses past the valve will reduce heat transfer from the exhaust gases to the valve allowing the valve to run cooler, improving valve life; and the reduced exhaust gas quenching will reduce unburned hydrocarbon concentration in the exhaust.

The exhaust gases that are normally emitted near the end of the exhaust stroke are rich in unburned hydrocarbons due to scavenging effects of the unburned boundary layers close to the cooler combustion chamber walls. Rapid closing of the exhaust valve will retain more of these rich gases for reburning and may eliminate the need for the catalytic converter. The use of exhaust gas retention may also eliminate the present exhaust gas recirculating devices.

Precise electronic control of the opening and closing times of the valves allows a control of the mass flow through the intake and exhaust valves in various operating modes with a resulting reduction of undesirable emissions, volumetric efficiency and generally allows an optimization of engine performance. Such precise electronic control can facilitate a number of further modifications including the fact that all valves may be closed when the engine is not in use, thereby eliminating exposure to the atmosphere and reducing corrosion within the combustion chambers.

Initial cranking to start the engine may be performed with appropriate valves maintained open until cranking speed is sufficiently high. This provides a "compressionless" cranking to aid cold weather starting. Leaving the cylinders in appropriately charged states coupled with proper introduction of ignition spark, allows the engine to be restarted without cranking when the engine has been stopped for a short time period, such as sitting at a stop light.

Control of the number of cylinders in use, as during steady state cruse on a highway, or other low demand condition allows the active cylinders to be operated more efficiently because of the superior entropy due to higher burn pressures and temperatures.

Reduction of unburned hydrocarbon emissions during deceleration is also possible. Conventionally valved engines develope high intake manifold vacuum during deceleration which enhances fuel evaporation on the manifold inner surface resulting in an overly rich mixture being burned. Further, the overly rich low density cylinder charge in the conventional engine may not ignite or burn as completely as it does under higher charge levels, hence, causing high unburned hydrocarbon emissions. Engines equipped with the present electronically controllable valve arrangement may be used to aid normal or rapid deceleration by closing selected valves for operation using fewer than the full complement of cylinders, no powered cylinders or cause the engine to absorb power in an air compressor mode.

When spark, fuel and valving are controlled, heat recovery by controlling air intake temperature is facilitated. For example, high heat recovery may be used when the combustin temperature is low as when operating the engine well below maximum torque. Such heat recovery may also help control combustibility under lean or high exhaust gas retention conditions. Ideally, the combustion temperature would be held to a predetermined maximum where one would have the best entropy position but yet controlled NOX production.

Reduced hydrocarbon emission results from less quenching at the exhaust valve, reduced exhaust gas blow-down time, lower emission at the end of the exhaust stroke as well as during deceleration, and generally less valve overlap operation. These combine to greatly reduce the need for catalytic converters. General improvement in efficiency may be achieved by increased expansion of the power stroke gases resulting from the very rapid opening of the present valve arrangement. The conventional exhaust valve may begin to open at 45 degrees before bottom dead center and at 60 psi gas pressure in order to achieve the momentum of the gas mass necessary to evacuate the exhaust gases against a great deal of exhaust gas valve port throttling. The valve of the present invention may be opened at near bottom dead center to utilize more of the expansion during the power stroke.

The full control of the opening and closing of the valves of a reciprocating engine allows for a design that has a basic high expansion ratio under normal operation and can effectively change that expansion ratio to allow for the same cylinder charge mass when the temperature of the charge varies. In order to take the greatest advantage of high expansion ratios, an engine of longer stroke for the same bore and end combustion chamber volume may be utilized. This makes it possible to recover heat from the exhaust making trade offs of higher efficiency due to lower entropy of the higher burn temperatures against the production of NOX due to these higher temperatures and the increased efficiency derived from higher expansion ratios.

FIGS. 10-14 illustrate timing diagrams for a conventional valve engine as compared to the pneutronic valve engine under idle, mid range and full power conditions for various modes of operation of a reciprocating engine. Most obvious is the fact that the timing for conventional valving does not vary with speed or torque in FIGS. 10a, 10b and 10c. FIG. 10a illustrates low speed operation; FIG. 10b, mid-range operation; and FIG. 10c, high speed operation, each independent of torque. FIG. 10d illustrates low speed operation for the present invention at either high or low torque, while FIGS. 10e and 10f show operation at mid-range, mid-torque and high range, high torque respectively. FIGS. 10d, 10e and 10f show an advantageous valve timing modification to a throttled engine with either carburetion or fuel injection using the valve arrangement of the present invention. This method, although improving engine performance greatly, does not utilize all of the possible advantages. In order to reduce pumping losses, the pneutronic valve engine with an unthrottled manifold and a direct intake port fuel injection, as opposed to standard engine valving with an air throttling carburetor for controlling the inlet mixture, allows the amount of air drawn into the pneutronic valve equipped engine to be proportional to the effective time the valve is left open. This time is controllable by the computer 81 to match any particular operating conditions. The method is somewhat different in a throttled engine using carburetion or fuel injection.

In FIGS. 11-14, the correspondingly lettered figures show essentially the same speed and torque conditions. FIGS. 11a-14a illustrate low torque at essentially any speed. FIGS. 11b-14b are mide-range, mid-torque depictions. FIGS. 11c-14c shown operation at high range and higher torque. FIGS. 11d-14d are low speed, high torque illustrations. FIGS. 11e-14e are mid-range, high torque illustrations. FIGS. 11f-14f show high range, high torque operation.

Figure 11A:
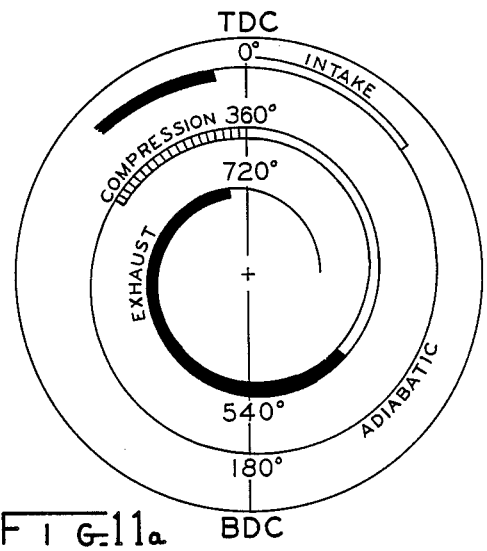

FIG. 11a illustrates that for idle or very low speed and low power operation, the pneutronic valve is opened for a very short time. The fast opening and fast closing of the valve is accomplished with very low throttling losses and is followed by a low loss (adiabatic) transition to the compression mode. The conventional engine must accomplish appreciable throttling work to induct a small quantity of air through the restsricted carburetor using the long valve opening time. Also in this idle or low power mode, the exhaust valve can be opened at bottom dead center, or at a time when expansion yields diminished, zero or negative work, to achieve maximum efficiency due to the extended controlled expansion capability (reducing emission of pollutants) and can be closed before top dead center to reduce pollutants. The standard engine exhaust valve wil expel more pollutants due to being open prior to bottom dead center and it exhausts unburned hydrocarbons which are purged off the walls of the combustion chamber when it stays open after a measured time prior to or after top dead center.

Figure 11D:
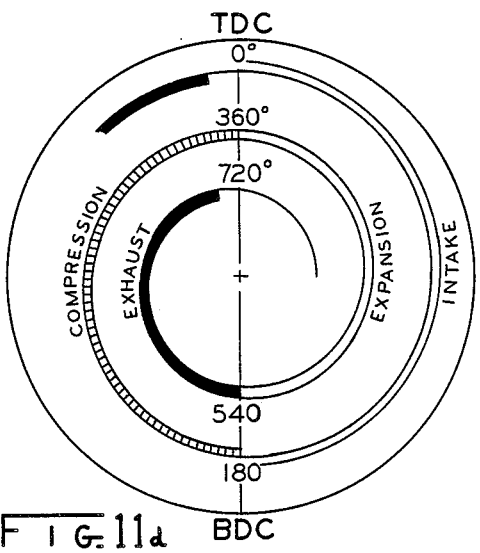
Figure 11B:
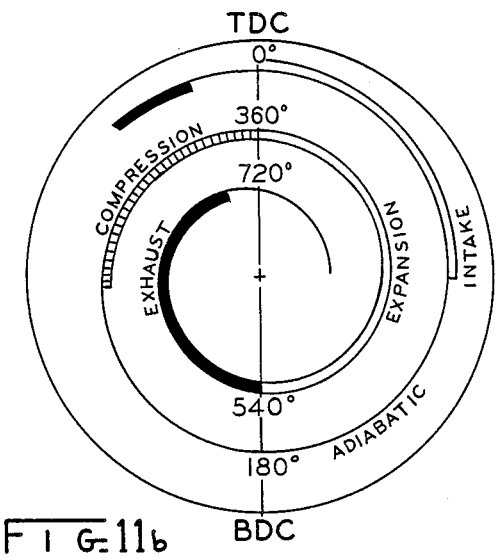

The midrange operation of FIG. 11b illustrates that the power stroke can be increased relative to the intake stroke to effectively increase fuel economy. The volume of the power stroke is about double that of the intake stroke and by being able to expand the high pressure gasses to a volume which is twice the swept volume of the intake, the engine will operate more efficiently due to higher expansion and, hence, lower exhaust gas temperatures and lower exhaust blow down losses. More of the engine's potential power is applied to the crank shaft as compared to the standard engine where expansion volume is about the same as intake volume and where significant throttling losses add to the inefficiency.

Figure 10C:
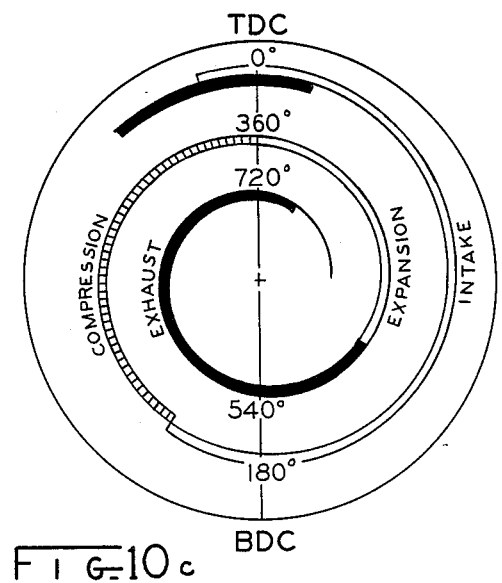
Figure 11E:
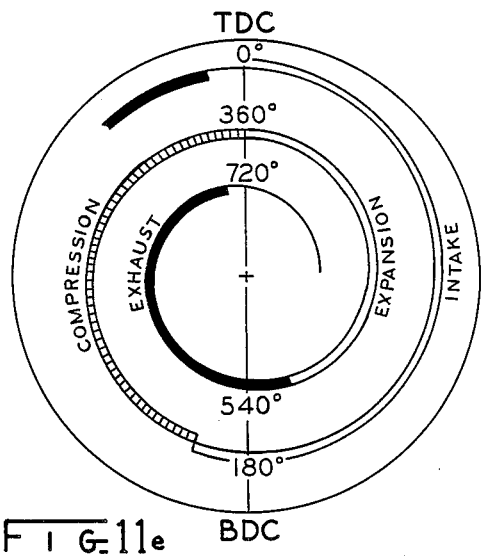
Figure 11C:
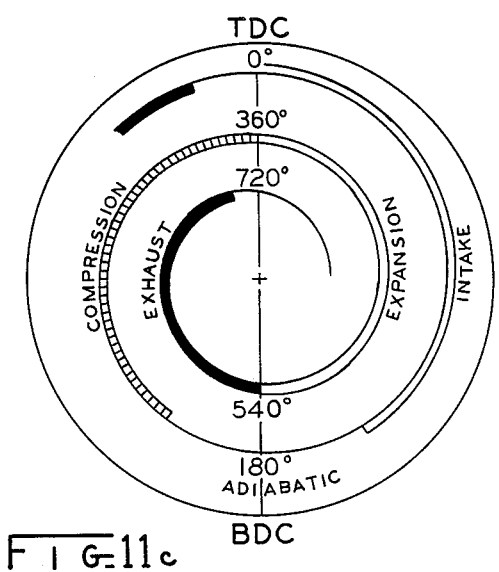
Figure 11F:
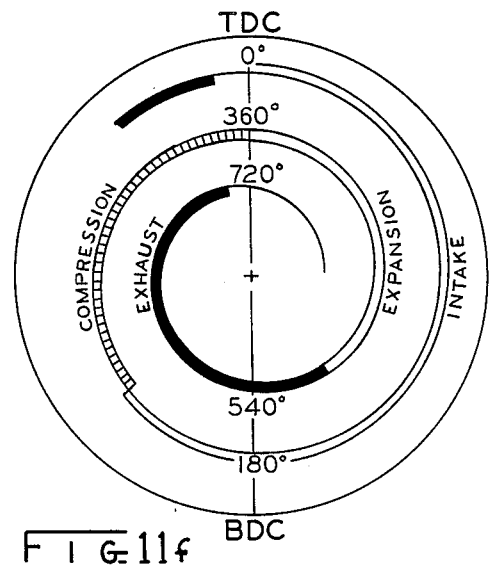

FIGS. 11c–11e show variations in timing under other engine operating circumstances. FIG. 11f shows that the full power characteristics of the present invention are similar to conventional engines where mass flow characteristics of the gasses are utilized to maximize volumetric efficiency; however, due to the rapid opening and closing of the pneutronic valve, the throttling losses are significantly reduced and much improved operation is obtained. It will be noted from a comparison of FIGS. 11f and 10c that less exhaust gas blowdown and no valve overlap are used to achieve superior performance. Valve overlap is eliminated significantly reducing the possible mixing of fuel air and exhaust gasses under varying engine operating conditions, and preventing unburned hydrocarbons on the combustion chamber walls from escaping out the exhaust. The useable power stroke is still longer than in a conventional engine adding power to the crankshaft which would otherwise be wasted in higher temperature exhaust gasses.

Figure 12A:
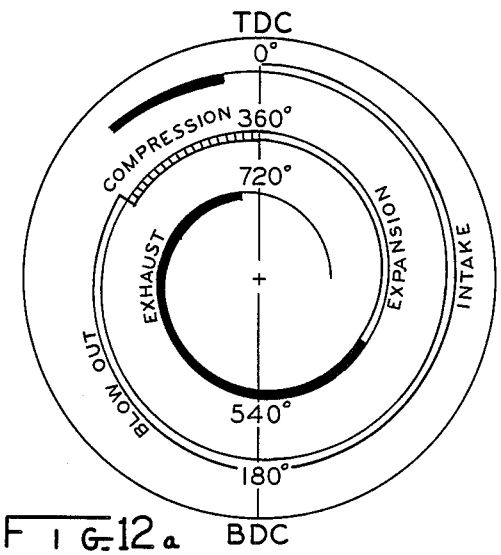
Figure 12D:
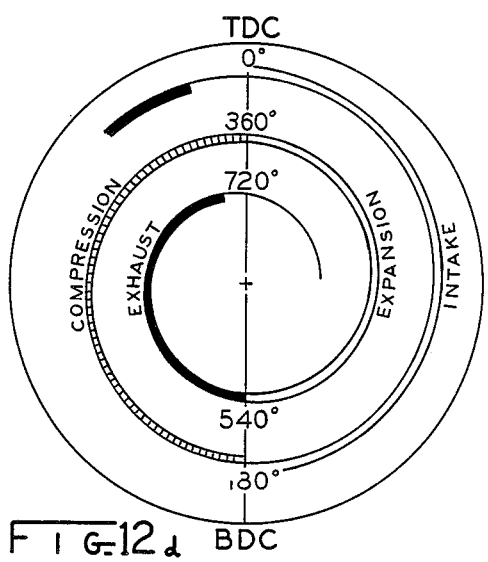
Figure 12B:
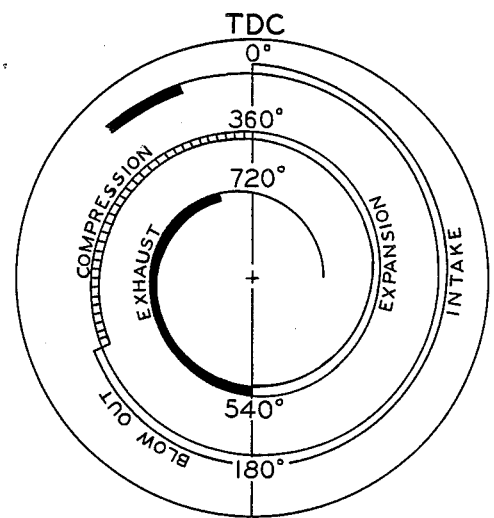
Figure 12E:
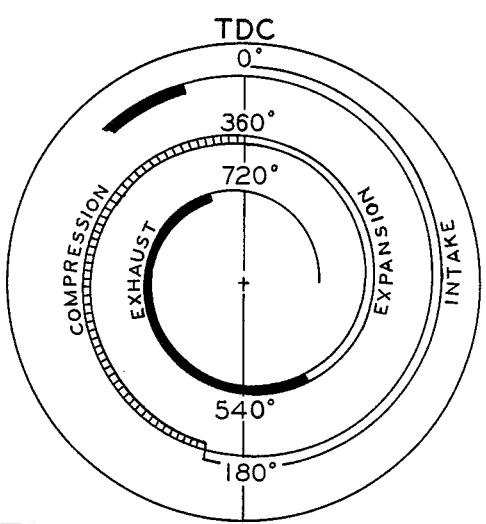
Figure 12C:
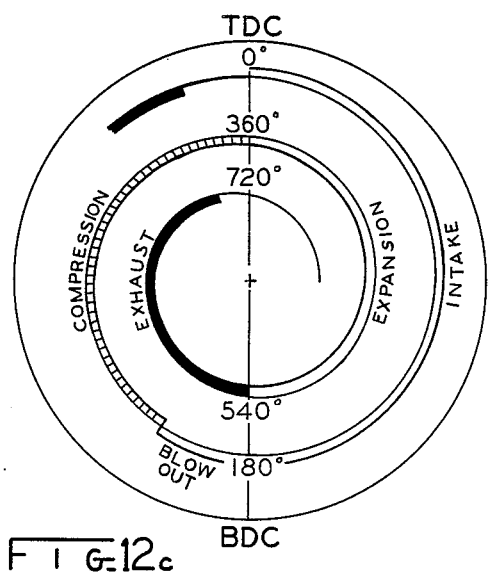
Figure 12F:
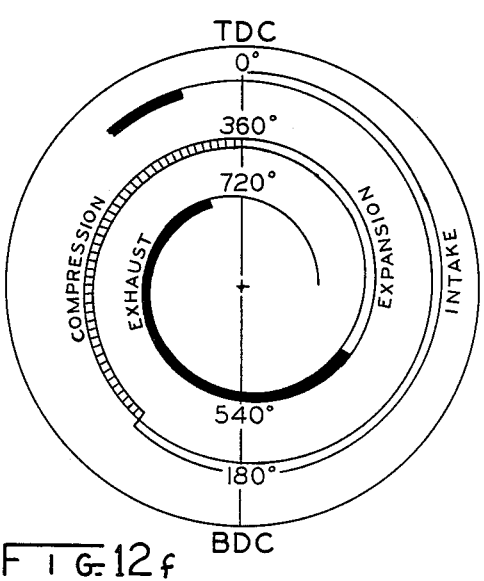
Figure 13A:
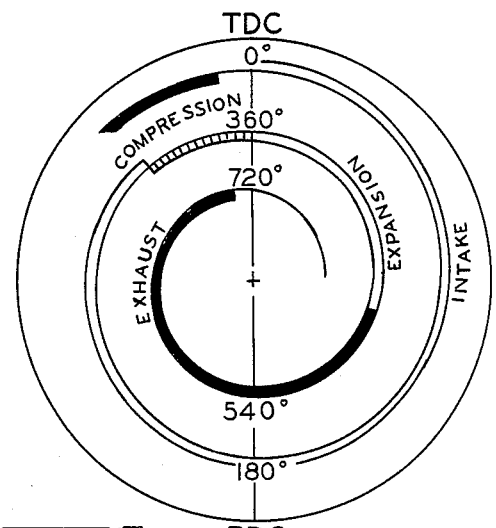
Figure 13D:
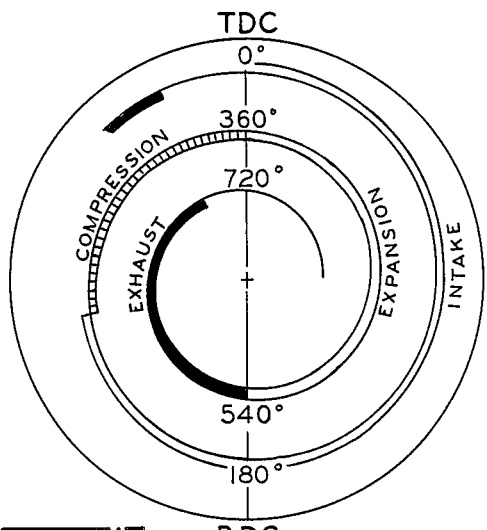
Figure 13B:
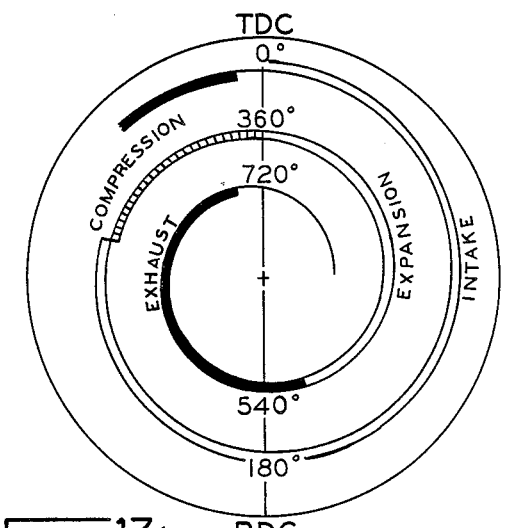
Figure 13E:
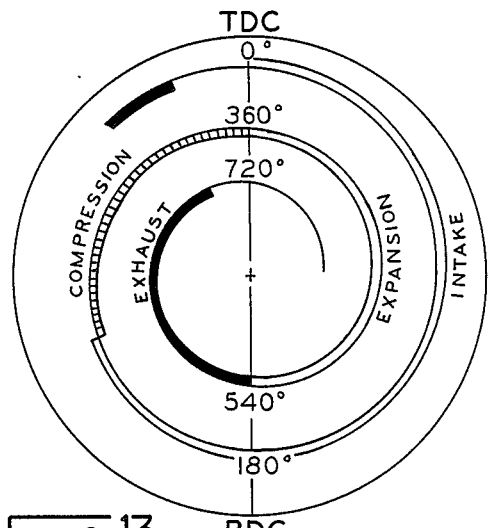
Figure 13C:
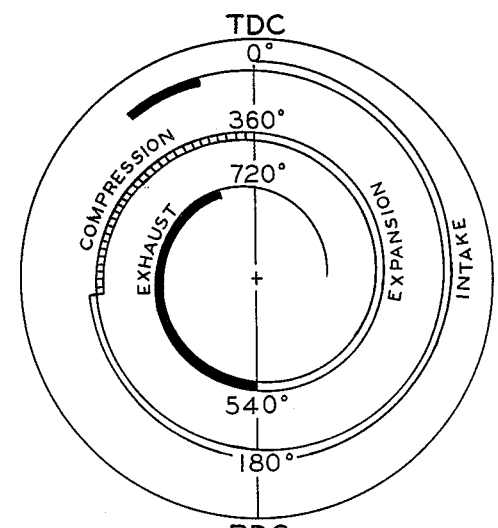
Figure 13F:
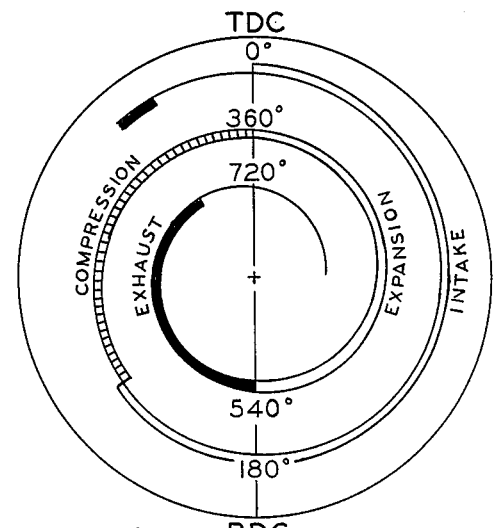
Figure 14A:
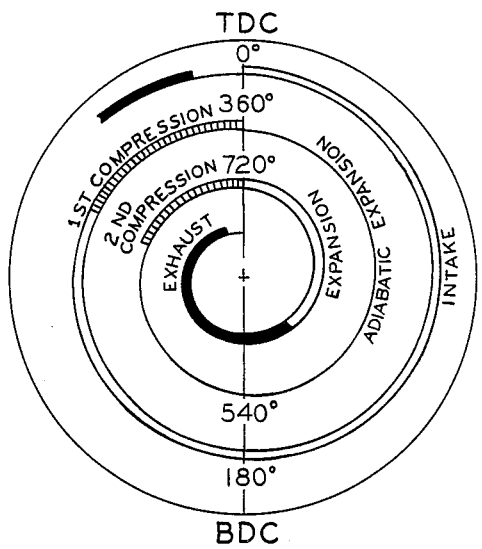
Figure 14B:
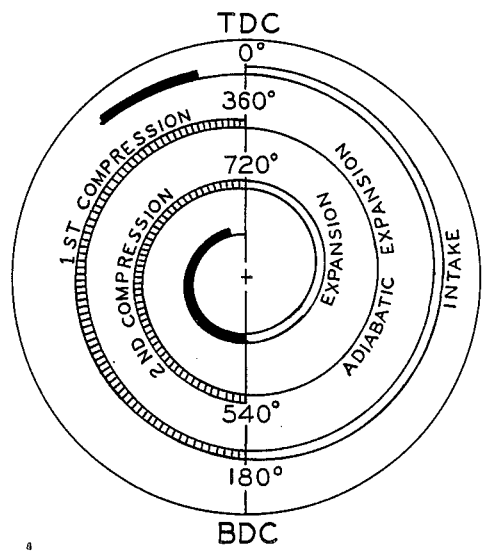

FIGS. 12a–12f are similar to FIGS. 11a–11f except for the illustration of an alternative mode of operating the intake valve. The mode of operation depicted in FIGS. 11a–11f will be referred to as "mode 1" while that depicted in FIGS. 12a–12f will be called "mode 2." At the low engine torque of FIG. 12a, the intake valve opens at top dead center and closes some time after more than 180 degrees of opening and at a time depending on the engine torque requirements. The sooner the valve closes after bottom dead center, the greater will be the retained ingested charge into the engine and, hence, the greater the engine's torque. Thus, FIGS. 11a and 12a illustrate equivalent effective charges being ingested in modes 1 and 2 respectively. The primary difference in the two modes of operation is that there are operating circumstances, such as at high RPM and low torque, where the mode 1 operation requires a valve to close very soon after having opened. In mode 2, the period of time between opening and closing is always at least 180 degrees of crankshaft rotation as compared to perhaps as low as 30 degrees of crankshaft rotation in mode 1. Hence, mode 1 may require extremely fast opening and closing times. The increase in energy required to effect these rapid valve responses is disproportionately high. For example, to operate the valve 180/30 +6 times as fast requires approximately the square or 36 times as much energy. Operating the valves in mode 2 requires far less energy and has other desirable characteristics.

In the operation of a four cylinder engine, there is a companion cylinder operating 180 degrees of rotation behind a given cylinder so that the excess air/fuel gases that are expelled by the given cylinder in mode 2 are taken in by the companion cylinder. An engine using this mode of operation would likely have a single central injection or carburetion of fuel. This exchange of intake gasses within the intake manifold more thoroughly mixes and evaporates the fuel and the cold starting characteristics of the engine are much improved.

Another advantage of operating intake valves in mode 2 as compared to mode 1 is that finer control over the ingested charge is expected at all engine speeds. In mode 1, the minimum charge is controlled by the time to open plus the time to close the intake valve. When the engine is operating at a higher speed, this minimum time consumes greater crankshaft angular rotation and the minimum charge may not be as low as desired. The minimum charge is not controlled by the sum of these opening and closing times in mode 2 and mode 2 allows for a full range of control over all engine speeds.

In the conventional cam operated poppet valve, the points in the engine cycle at which opening and closing commences is fixed, but the actual time required for the valve to move between closed and open positions depends on engine speed. With the valve arrangement of the present invention, movement between closed and open positions is very rapid and independent of engine speed, and the point in the cylce where such opening or closing commences is selectable.

Figure 10A:
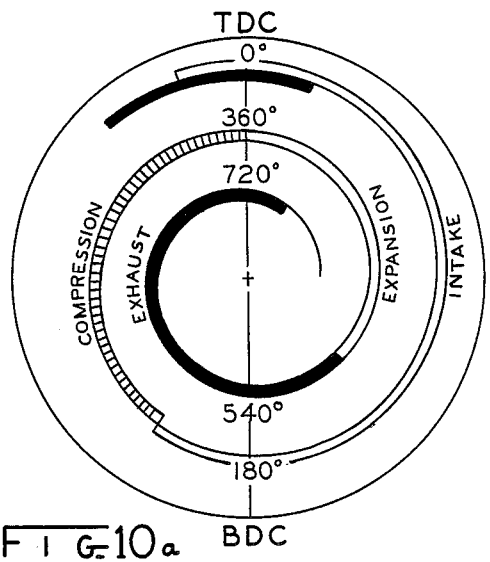
FIGS. 10a-10f, 11a-11f, 12a-12f, 13a-13f, 14a, and 14b are comparative valve timing diagrams showing different possible operating modes.
Figure 10D:
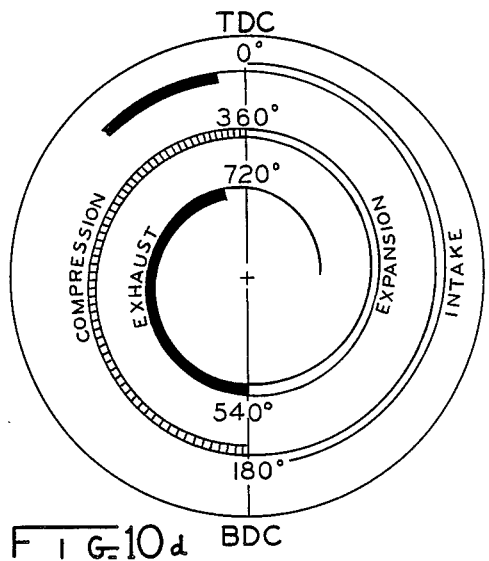
Figure 10B:
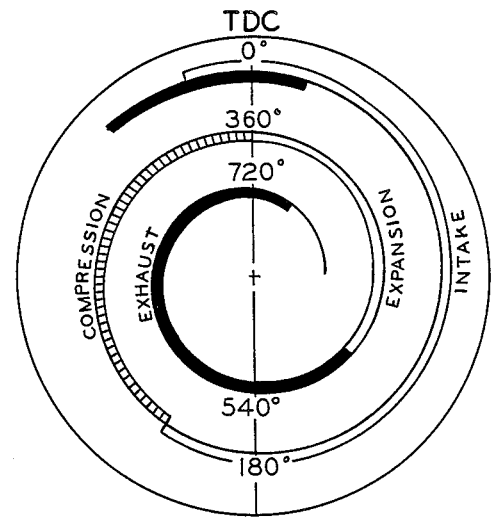
Figure 10E:
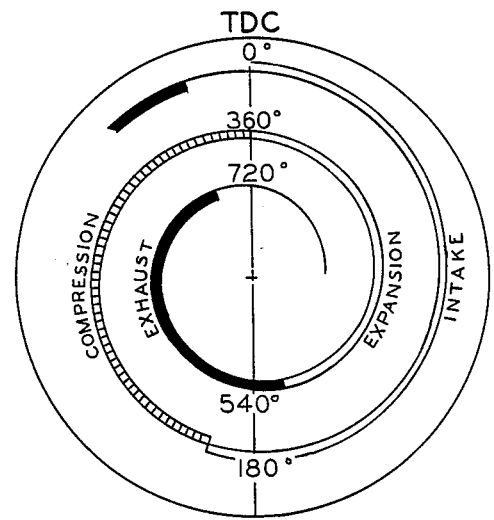

A study of the valve timing diagrams for a cam actuated valve as shown in FIGS. 10a–10c as compared to the corresponding diagrams for a valve operated in accordance with the present invention as shown in FIGS. 10c–10f reveals some of the distinct advantages of using computer controlled valving on a throttled engine. In FIG. 10d in contrast to FIG. 10a, the timing is such that there is no undersirable valve overlap or energy sacrificing exhaust blow down with its high emission of unburned hydrocarbons at these lower engine speeds. Further, there is no back flow loss due to late closing of the intake valve. A controlled exhaust gas retention timing of the exhaust valve closure also reduces the end cycle expulsion of unburned hydrocarbons.

Figure 10F:
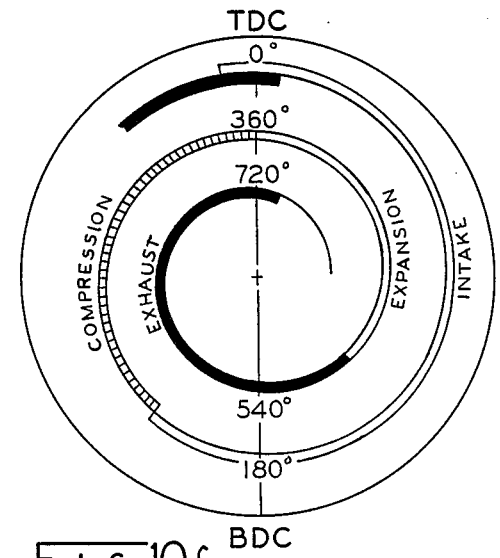

FIGS. 10e and 10f show changes in timing to optimize volumetric efficiency and to minimize loss of energy and emission of unburned hydrocarbons in exhaust gas blow down. This, along with the rapidity of the valve opening, greatly affects mass flow profile as well as greatly reducing the heating of the exhaust valve. Reduction in valve heating, in turn, may allow the advantageous use of lower cost materials for the exhaust valve. Timing changes are made to address volumetric efficiency, efficiency, pollution and performance such as taking advantage of the benefits of improved mass flow for a particular enging operating point.

In particular, FIG. 10f shows a profile where tradeoffs are made in favor of optimization of torque at high RPM. Attention must be given to the fact that, although FIG. 10c and 10f look similar, the system of FIG. 10f can be adjusted to have a much improved volumetric efficiency over the use of a standard cam because of the greatly reduced throttling of the valves in FIG. 10f. The reduction in throttling for various engine speeds is illustrated in FIG. 9. Because of the availability of ready adjustability, optimization can be had at all engine operating circumstances.

The modes of operation shown in FIGS. 11 and 12 may both take advantage of operation of the intake manifold at or near atmospheric pressure thereby significantly reducing the pumping losses associated with conventional throttled engines. FIGS. 12, as opposed to FIG. 11, shows a technique which allows for lower valve opening and closing velocities. The power consumed by a valve mechanism is directly proportional to the square of the effective valve velocity or inversely proportional to the square of the valve transition time with appropriate allowance being made for acceleration and deceleration.

Valve operation in mode 1 as depicted in FIG. 11 may be used at comparatively low speeds when the duration of valve operation (the time the valve remains open or closed) is sufficiently long compared to the time required to actuate or move the valve from one position to the other. At higher engine RPM, the engine may be switched over to mode 2. It will be noted that, in mode 1, the portion of the cylce during which the intake valve is open increases as engine speed increases while in mode 2, the portion of the cycle during which the intake valve is open descreases with increasing engine speed, compare FIGS. 11a-11c with FIGS. 12a-12c.

On starting, mode 2 has a highly desirable feature of treating the fuel to a more turbulent experience and, hence, is superior to mode 1 in evaporating the fuel in the air/fuel charge for cold starting. While not shown in FIGS. 11 and 12, cranking of the engine may also take place with the exhaust valve kept open and the intake valve kept closed to take advantage of engine momentum to help engine starting when the valves are suddenly properly sequenced. Such delayed valve operation starting may be in either mode 1 or mode 2 and may use delayed input valve opening to develop high velocity and turbulent air/fuel mixture flow with its associated improved evaporation and mixing of the air/fuel charge.

It is also possible to keep both intake and exhaust valves closed with ignition held in abeyance to allow a vehicle or load to motor an engine in an adiabatic way for conditions where no positive torque is required. For increased slow down (i.e., for absorbing shaft energy) where a variable negative torque is required, the non-fuelded, nonignited engine can have the valves appropriately timed and be effectively used for braking.

FIG. 13 illustrates the valve timing for an engine with an increased stroke to take advantage of the high efficiencies offered by still higher expansion ratios. In FIG. 13a, the exhaust valve opens early to prevent condensation and/or negative torque which might otherwise occur because of the lower exhaust temperature and pressure in a high expansion ratio engine. The versatile valve timing agin allows techniques to be effecitvely applied to prevent high combustion temperatures with the associated engine knock and NOX production as well as to exercise effective heat recovery.

In intake stroke of FIG. 13 with its possibly high volumetric efficiency could yield peak pressures and temperatures of the ignited compressed gas such as to produce a high probability of engine knock and high NOX production. The burn rate may be reduced and the peak flame temperature reduced by increased levels of exhaust gas retention. A lean fuel to air mixture will also help reduce this problem and, at the same time, promote the desirable lean burn condition. Such schemes are not practical because of the versatile computer controlled valve operation in conjunction with mixture and ignition control. With this arrangement, other engine cycles alone or in combination may now be employed for verstile performance.

In FIG. 14, a six stroke cycle mode of operation is shown. This differs from the previously discussed four stroke cycle in that the ingested fuel/air mixture goes through an essentially adiabatic intake-compression-expansion cycle prior to the compression cycle of four stroke operation. This additional cycle more thoroughly evaporates and mixes the fuel and air. Such a mode of operation will aid cold starting and warm-up of an engine and the engine may be converted to four stroke cycle subsequent to the warm-up if desired. Such a mode of operation will also allow the burning of less volatile fuels such as kerosene.

From the foregoing, it is now apparent that a novel bistable pneumatically powered electronically controlled valve actuator arrangement particularly suited to control the valving of internal combustion engines, external combustion engines, reciprocating compressors and other similar devices along with new and unique alternative modes of operating an internal combustion engine have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. An electronically controllable pneumatically powered valve mechanism for use in an internal combustion engine comprising:
   an engine valve having an elongated valve stem;
   pneumatic motive means including a source of compressed air and a piston having first and second opposed faces, the piston fixed to and movable with the engine valve for causing the valve to move in the direction of stem elongation between valve-open and valve-closed positions; and
   pneumatic means for decelerating the valve as the valve nears one of said valve-open and valve-closed positions including an air vent located about midway between the valve-open and valve-closed positions for relieving air pressure from one face of the piston while allowing the opposite face of the piston to trap and compress air to slow valve motion as the valve gets close to said one position.

2. A bistable electronically controllable pneumatically powered valve mechanism for use in an internal combustion engine comprising:
   an engine valve having an elongated valve stem;
   pneumatic motive means for causing the valve to move in the direction of stem elongation between valve-open and valve-closed positions;
   magnetic latching means for holding the valve in each of the valve-open and valve-closed positions; and
   means for releasing the magnetic latching means allowing the pneumatic motive means to move the valve.

3. The bistable electronically controllable pneumatically powered valve mechanism of claim 2 wherein the means for releasing comprises an electromagnetic arrangement for temporarily neutralizing the effect of the magnetic latching means to release the valve to move from one of said positions to the other of said positions.

4. The bistable electronically controllable pneumatically powered valve mechanism of claim 3 further comprising control circuitry for temporarily energizing the electromagnetic arrangement.

5. The bistable electronically controllable pneumatically powered valve mechanism of claim 2 wherein the pneumatic motive means comprising a source of compressed air, a piston fixed to and movable with the engine valve, an air vent located about midway between the valve-oopen and the valve-closed positions for dumping air and removing the accelerating force from the piston as it approaches one of the positions for dynamic braking of and energy recovery from valve motion as the valve nears said one position.

6. A bistable electronically controlled pneumatically powered transducer having an armature reciprocable between first and second positions, motive means for causing the armature to move, a permanent magnet latching arrangement for holding the armature in either one of said positions, and an electromagnetic arrangement for temporarily neutralizing the effect of the permanent magnet latching arrangement to release the armature to move from one of said postions to the other of said positions.

7. A bistable electronically controlled pneumatically powered transducer having an armature reciprocable between first and second positions, a latching arrangement for maintaining the armature in either one of said positions, and an electromagnetic arrangement operable when energized to at least partially neutralize the latching arrangement and dislodge the armature from the position in which the armature was maintained.

8. The bistable electronically controlled pneumatically powered transducer of claim 7 further comprising control circuitry for temporarily energizing the electromagnetic arrangement.

9. A bistable electronically controlled pneumatically powered transducer having an armature reciprocable between first and second positions, motive means comprising a source of compressed air, a piston fixed to and movable with the armature, an air vent located about midway between the first and second positions for dumping air and removing the accelerating force from the piston as it approches one of the first and second positions, and for braking of and energy recovery from armature motion as the armature nears said one position.

10. The bistable electronically controlled pneumatically powered transducer of claim 9 further comprising a magnetic latching arrangement for holding the armature in one of the first and second positions.

11. The bistable electronically controlled pneumatically powered transducer of claim 10 further comprising an electromagnetic arrangement for temporarily neutralizing the magnetic field of the magnetic latching arrangement.

12. The bistable electronically controlled pneumatically powered transducer of claim 9 further comprising a pair of pneumatic seals, one engaging one surface of the piston when the armature is in the first position and the other engaging an opposite surface of the piston when the armature is in the second position, each seal, when engaging a piston surface, reducing the piston surface area exposed to the source of compressed air thereby reducing the effective force on the armature.

13. An electronically controllable pneumatically powered valve mechanism for use in an internal combustion engine comprising:
    an engine valve having an elongated valve stem;
    pneumatic motive means for causing the valve to move in the direction of stem elongation between valve-open and valve-closed positions comprising a source of compressed air, a piston fixed to and movable with the engine valve, an air vent located about midway between piston positions corresponding to the valve-open and the valve-closed positions for dumping air and removing the accelerating force from the piston as it approches one of the positions and for dynamic braking of and energy recovery from valve motion as the valve nears said one position.

14. The electronically controllable pneumatically powered valve mechanism of claim 13 further comprising latching means for holding the valve in each of the valve-open and valve-closed positions and means for releasing the latching means allowing the pneumatic motive means to move the valve.

15. The electronically controllable pneumatically powered valve mechanism of claim 13 further comprising valve means for relieving the dynamic braking slightly prior to the valve reaching said one position.

* * * * *